United States Patent
Xin et al.

(10) Patent No.: US 10,305,666 B2
(45) Date of Patent: May 28, 2019

(54) SYSTEMS AND METHODS FOR MULTI-CHANNEL BEACON TRANSMISSION IN A WIRELESS NETWORK

(71) Applicants: Yan Xin, Kanata (CA); Sheng Sun, Kanata (CA); Osama Aboul-Magd, Kanata (CA)

(72) Inventors: Yan Xin, Kanata (CA); Sheng Sun, Kanata (CA); Osama Aboul-Magd, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 15/295,491

(22) Filed: Oct. 17, 2016

(65) Prior Publication Data

US 2017/0134145 A1 May 11, 2017

Related U.S. Application Data

(60) Provisional application No. 62/251,565, filed on Nov. 5, 2015.

(51) Int. Cl.
*H04L 1/00* (2006.01)
*H04L 5/00* (2006.01)
*H04W 16/28* (2009.01)
*H04W 88/08* (2009.01)

(52) U.S. Cl.
CPC .......... *H04L 5/0092* (2013.01); *H04L 1/0009* (2013.01); *H04L 5/0053* (2013.01); *H04W 16/28* (2013.01); *H04W 88/08* (2013.01)

(58) Field of Classification Search
CPC .................................. H04J 3/17; H04L 12/56
See application file for complete search history.

(56) References Cited

U.S. PATENT DOCUMENTS

| | | | |
|---|---|---|---|
| 2006/0057964 A1* | 3/2006 | Roy | H04B 7/0408 455/67.11 |
| 2008/0123680 A1* | 5/2008 | Ko | H04J 3/17 370/433 |
| 2008/0144498 A1* | 6/2008 | Chung | H04L 47/10 370/231 |
| 2010/0177756 A1 | 7/2010 | Choi et al. | |
| 2012/0294246 A1 | 11/2012 | Cariou et al. | |

(Continued)

FOREIGN PATENT DOCUMENTS

| | | |
|---|---|---|
| CN | 103118406 A | 5/2013 |
| WO | 2014099005 A1 | 6/2014 |

OTHER PUBLICATIONS

IEEE Standard for information technology—Telecommunications and information exchange between systems Local and metropolitan area networks, Part 11: Wireless LAN Medium Access Control (MAC) and Physical Layer (PHY) Specifications, IEEE Std 802.11ad, Dec. 28, 2012.

(Continued)

*Primary Examiner* — Melanie Jagannathan (57) ABSTRACT

A method includes transmitting with a selected antenna of an access point, one or more first beacon frames over a primary channel within a beacon transmission interval, and transmitting with the selected antenna of the access point, one or more second beacon frames over a secondary channel within the beacon transmission interval.

20 Claims, 10 Drawing Sheets

(56) References Cited

U.S. PATENT DOCUMENTS

| | | | | |
|---|---|---|---|---|
| 2013/0072106 A1* | 3/2013 | Koskela | ............... | H04W 16/14 |
| | | | | 455/3.01 |
| 2015/0289142 A1* | 10/2015 | Abeysekera | .......... | H04W 24/02 |
| | | | | 370/338 |
| 2015/0350382 A1* | 12/2015 | Abraham | ............... | H04L 69/14 |
| | | | | 370/276 |
| 2015/0382200 A1* | 12/2015 | Li | .......................... | H04L 5/001 |
| | | | | 370/336 |
| 2016/0241314 A1* | 8/2016 | Ferrante | ............ | H04W 72/0406 |
| 2016/0323058 A1* | 11/2016 | Cordeiro | ............... | H04L 1/0003 |
| 2017/0034823 A1* | 2/2017 | Cariou | .................. | H04W 72/12 |

OTHER PUBLICATIONS

Robert. J. Mailloux, Phased Array Antenna Handbook, 2nd Ed., Artech House, 2005.

\* cited by examiner

FIG. 9

SYSTEMS AND METHODS FOR MULTI-CHANNEL BEACON TRANSMISSION IN A WIRELESS NETWORK

CROSS-REFERENCE TO RELATED APPLICATIONS

This application is based on, and claims benefit of, U.S. application Ser. No. 62/251,565 filed on Nov. 5, 2015, the entire content of which is hereby incorporated herein by reference.

FIELD OF THE INVENTION

The present invention pertains to the field of wireless communication networks, and in particular to systems and methods for multi-channel beacon transmission in wireless communication networks.

BACKGROUND

Beacon frames are data packets periodically transmitted by an access point (AP) in an infrastructure basic service set (BSS) to announce the presence of a wireless LAN to nearby wireless devices. The beacon frame contains information about the network, including its capabilities and configuration. A wireless device may receive multiple beacon frames from different APs, from which it may determine the best AP to establish channel access based on criteria such as signal strength. Accordingly, systems and methods providing enhanced versatility in the transmission of beacon frames are desired.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved system and method for transmitting beacon frames in a wireless communications network.

In accordance with embodiments of the present invention, there is provided a method for transmitting beacon frames from an access point including at least one antenna. The method comprising: transmitting with a selected antenna of the access point, one or more first beacon frames over a primary channel within a beacon transmission interval; and transmitting with the selected antenna of the access point, one or more second beacon frames over a secondary channel within the beacon transmission interval.

In accordance with embodiments of the present invention, there is provided an access point of a communications network. The access point comprising: at least one antenna; at least one central processing unit; and a non-transitory storage medium comprising software instructions for controlling the at least one central processing unit to perform steps of: transmitting with a selected antenna of the access point, one or more first beacon frames over a primary channel within a beacon transmission interval; and transmitting with the selected antenna of the access point, one or more second beacon frames over a secondary channel within the beacon transmission interval.

In accordance with embodiments of the present invention, there is provided a method for performing beamforming operations with an access point. The method comprising: receiving, by a station, one or more beacon frames transmitted from the access point; determining, by the station, whether there are multiple channels available for beamforming operations, based on the received one or more beacon frames; and when there are multiple channels available, engaging, by the station, the access point using a selected one of the available channels to perform beamforming operations.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The reception of beacon frames is the first step for a wireless device (such as a Station (STA), including a User Equipment (UE), phone, laptop, computer, or any device capable of using IEEE 802.11 protocol) to establish channel access to an Access Point (AP, including a personal basic service set control point/access point (PCP/AP)). After receiving a beacon frame, the wireless device can choose to engage the AP to establish a communication link, which may involve performing beamforming functions given the highly directional nature of certain antenna arrays and carrier frequencies.

Figure 1:
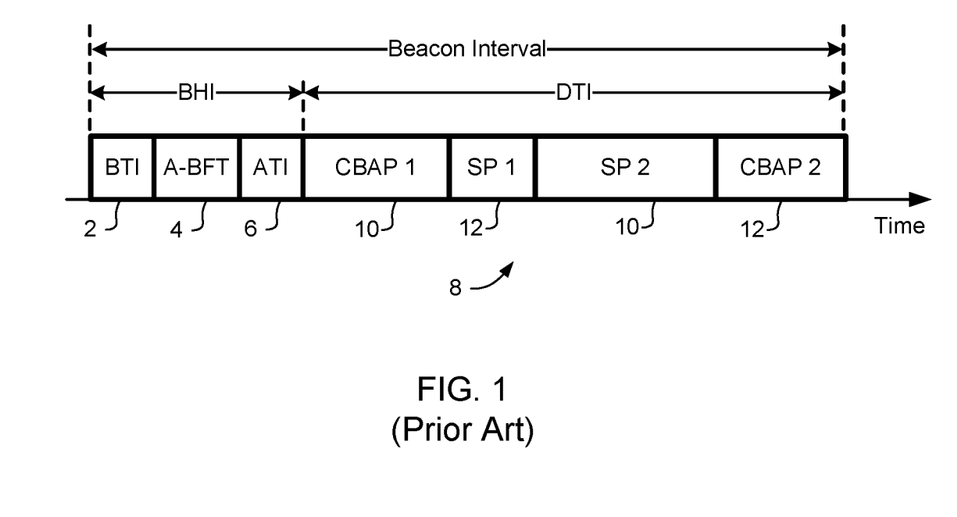
FIG. 1 is a beacon interval illustrating the signaling structure between a station (STA) and a personal basic service set control point/access point (PCP/AP) known, for example, from IEEE802.11ad.

As may be appreciated, STAs and APs (including PCP/APs) may be provided as any desired combination of hardware and software configured to perform their intended functions. Typically, STAs and APs (including PCP/APs) will comprise at least one processor such as a central processing unit (CPU) coupled to a memory such as a non-transitory storage medium storing software instructions for controlling the processor(s) to perform functions in accordance with the present disclosure. In addition, STAs and APs (including PCP/APs) will normally include radio communication hardware coupled to the processor(s) and configured to establish and maintain radio communications links between each other and with other STAs and APs, in accordance with one or more protocols such as IEEE802.11, for example FIG. 1 is an example of a Beacon Interval, which illustrates the signaling structure used between a PCP/AP and an STA to establish channel access under certain Wi-Fi protocols such as IEEE 802.11ad. As shown, the Beacon Interval includes a Beacon Transmission Interval (BTI) 2, an Association Beamforming Training (A-BFT) period 4, an Announcement Transmission Interval (ATI) 6, and a Data Transfer Interval (DTI) 8.

The BTI 2 is an access period during which one or more beacon frames 18 are broadcast by the PCP/AP. The beacon frames 18 may be Directional Multi Gigabit (DMG) beacon frames known, for example, from IEEE802.11ad, but this is not essential. Each beacon frame 18 preferably includes broadcast information, and may also contain a Sector Sweep (SSW) field used for performing initiator sector sweep (ISS) beamforming training. The A-BFT 4 is an access period during which further sector level sweep (SLS) beamforming training may also be performed, and includes the exchange of Sector Sweep (SSW) and SSW-feedback frames between STAs and the PCP/AP to select the best sector for transmitting frames. The ATI 6 is an access period during which request-response based management information between the PCP/AP and STAs may be exchanged. The management information may include management frames, such as information request/response frames, association request/response frames, and so forth. The DTI 8 is an access period during which data frames may be exchanged between the PCP/AP and STAs, or between STAs, and may include one or more contention-based access periods (CBAP 1, CBAP 2) 10 and scheduled service periods (SP 1, SP 2) 12.

Figure 2A:
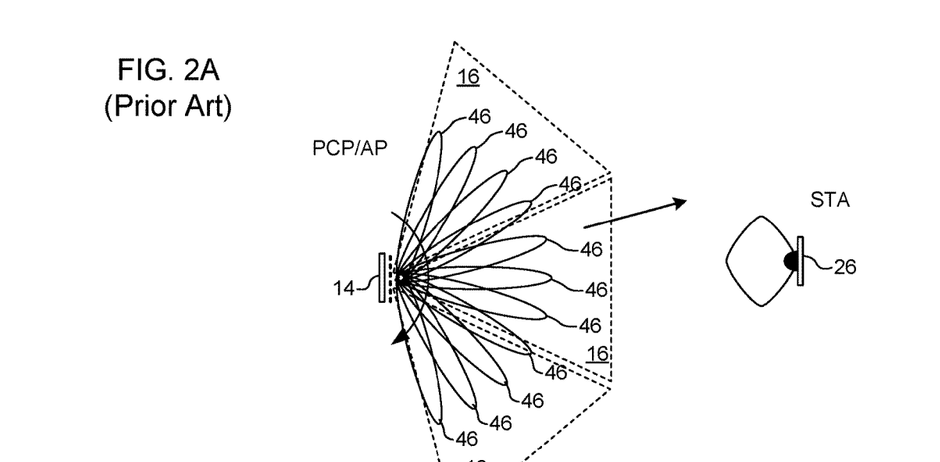
FIG. 2A illustrates the transmission of beacon frames from various sectors of the PCP/AP to an STA known, for example, from IEEE802.11ad.
Figure 2B:
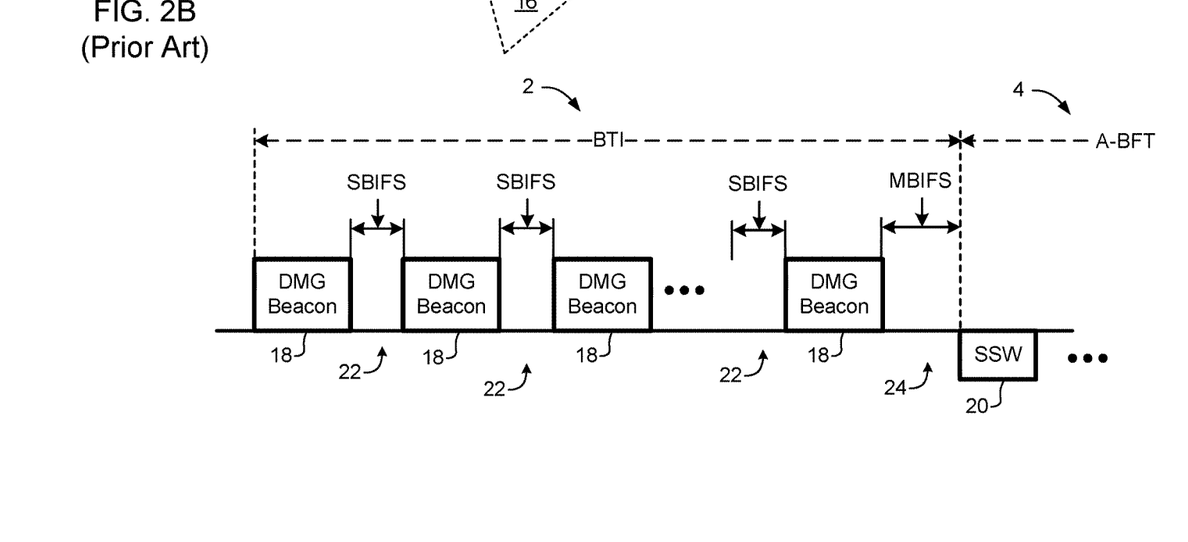
FIG. 2B illustrates the consecutive transmission of beacon frames separated by short beamforming interframe space (SBIFS) between the beacon frames during a beacon transmission interval (BTI) known, for example, from IEEE802.11ad.
Figure 2C:
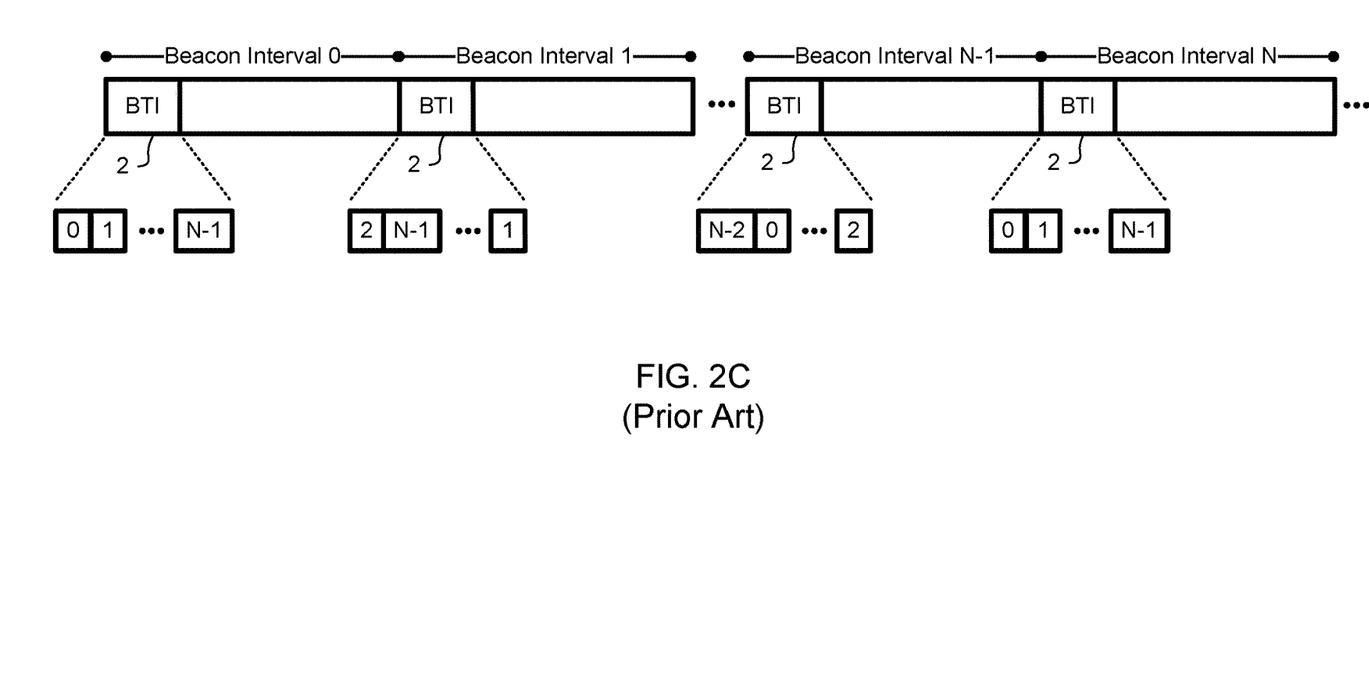
FIG. 2C illustrates the BTI process repeated in successive beacon intervals known, for example, from IEEE802.11ad.

FIGS. 2A to 2C illustrate an example of beacon frame transmission during the BTI 2 also used for performing ISS beamforming training. As shown in FIG. 2A, the PCP/AP includes one or more antenna arrays 14, each of which can generate M (where M is an integer) sectors 16 configured to transmit in different directions. During the BTI 2, as shown in FIG. 2B, the PCP/AP sequentially broadcasts N (where N is an integer) beacon frames 18, each beacon frame 18 being sent from one of its M different sectors 16 (as shown in FIG. 2A) including an SSW field 20 that contains an antenna ID and sector ID to identify the respective antenna 14 and sector 16 from which it was sent. The beacon frames 18 are transmitted over a single channel, and are each separated by short beamforming inter-frame space (SBIFS, typically 1 μs in duration) 22. A medium beamforming inter-frame space (MBIFS, typically 9 μs in duration) 24 follows after transmission of the last beacon frame 18 and before A-BFT 4 begins. One or more STAs 26 (as shown in FIG. 2A) may receive the beacon frames 18, and thereafter engage the PCP/AP for channel access through A-BFT 4 if desired. As shown in FIG. 2C, the BTI 2 process is repeated over successive beacon intervals in order to continually announce the presence of the PCP/AP to any other STAs which may later arrive.

Figure 3A:
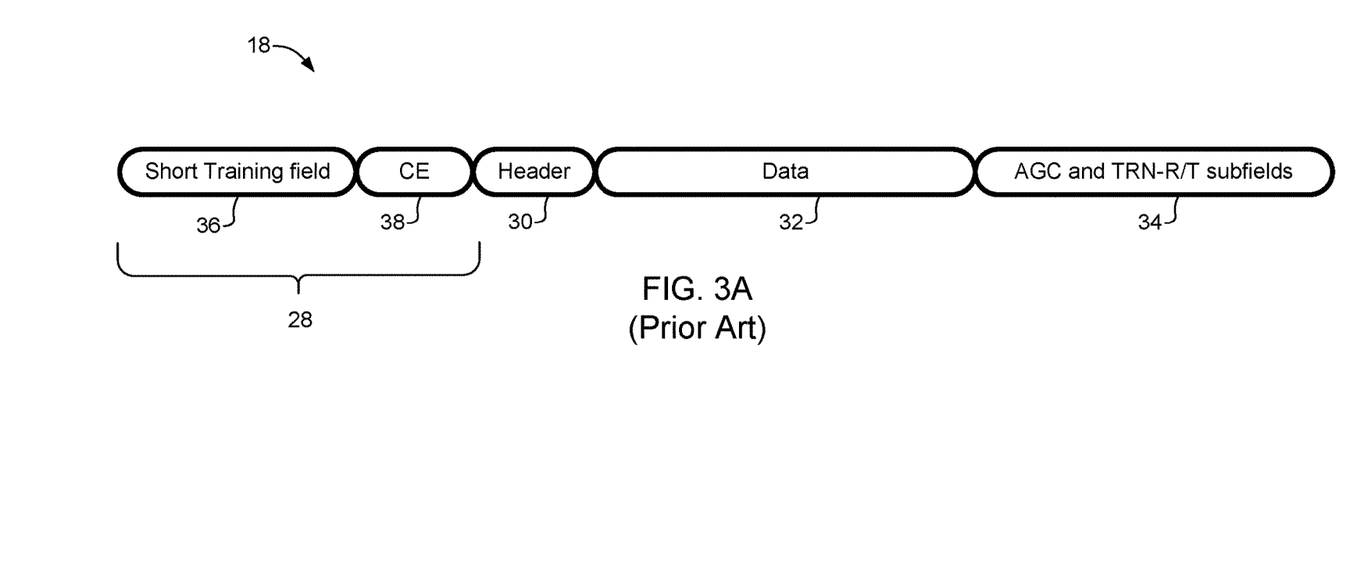
FIG. 3A illustrates a control physical layer (PHY) packet structure of a beacon frame known, for example, from IEEE802.11ad.
Figure 3B:
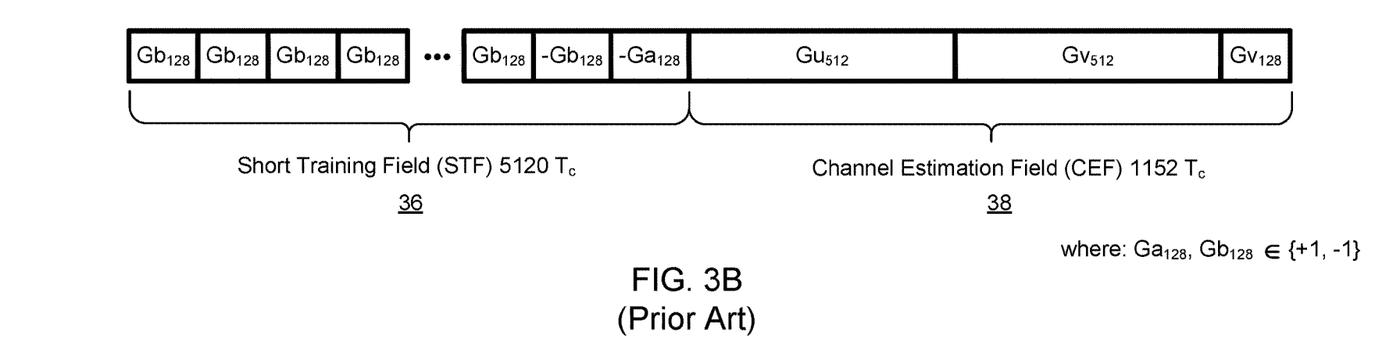
FIG. 3B illustrates the preamble field of the packet structure in FIG. 3A known, for example, from IEEE802.11ad.

FIGS. 3A and 3B illustrate an example of a control physical layer (PHY) packet structure to transmit a beacon frame 18. As shown in FIG. 3A, the control PHY frame packet structure contains a preamble field 28, a header field 30, a data field 32, and automatic gain control (AGC) and training receive/transmit (TRN-R/T) subfields 34. As shown in FIG. 3B, the preamble 28 contains a short training field (STF) 36 and a channel estimation field (CEF) 38. The STF and CEF may, for example, contain multiple 128 bit Golay sequences to meet a desired correlation property. Golay sequences are known to those of ordinary skill in the art and therefore will not be described in further detail herein.

Figure 4:
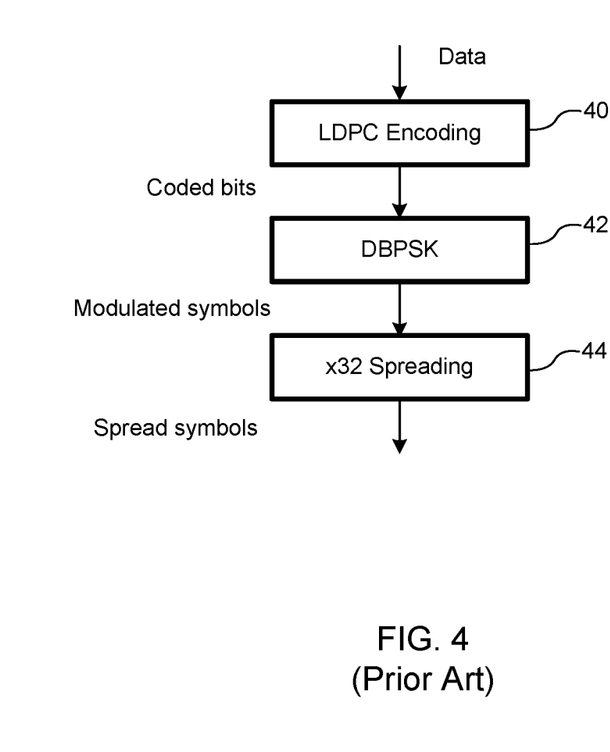
FIG. 4 illustrates application of a modulation and coding scheme (MCS) to a beacon frame packet known, for example, from IEEE802.11ad.

FIG. 4 is an example of the modulation and coding scheme (MCS) that a beacon frame packet may undergo prior to transmission by a PCP/AP. MCS may be performed on both of the header 30 and data portions 32 of the beacon frame packet 18. As shown in FIG. 4, the beacon frame packet 18 may be encoded (at 40) using a Low Density Parity Check (LDPC) encoding to transform data into coded bits. The coded bits may then be processed (at 42) using a Differential Binary Phase Shift Keying (DBPSK) function to generate corresponding DPSK symbols representative of the coded bits. The DPSK symbols are then processed (at 44) using an ×32 Spreading function to generate spread symbols. The spread symbols may then be transmitted by the PCP/AP over a selected communications channel to one or more STAs.

One issue that must be considered when transmitting beacon frames 18 over a single channel in a phased antenna array 14, such as that shown in FIG. 2A, is beam squinting. The selection of different transmission sectors 16 (for example the MN sectors in FIG. 2A) involves the use of complex weights, phase shifters, delays, and frequencies applied to different antenna elements of the array, such that each sector "steers" transmissions in a certain direction. For example, the main lobe of a beam may occur in a desired direction or angle $\theta_0$ at a carrier frequency $f_0$. However, when using the same weighting factors applied to the antenna elements, the main lobe of the beam for a different carrier frequency may occur at a different angle $\theta$. The relationship between $\theta_0$ and $\theta$ may be described by:

$$\sin\theta = \sin\left(\theta_0 \cdot \frac{f_0}{f}\right)$$

Figure 5:
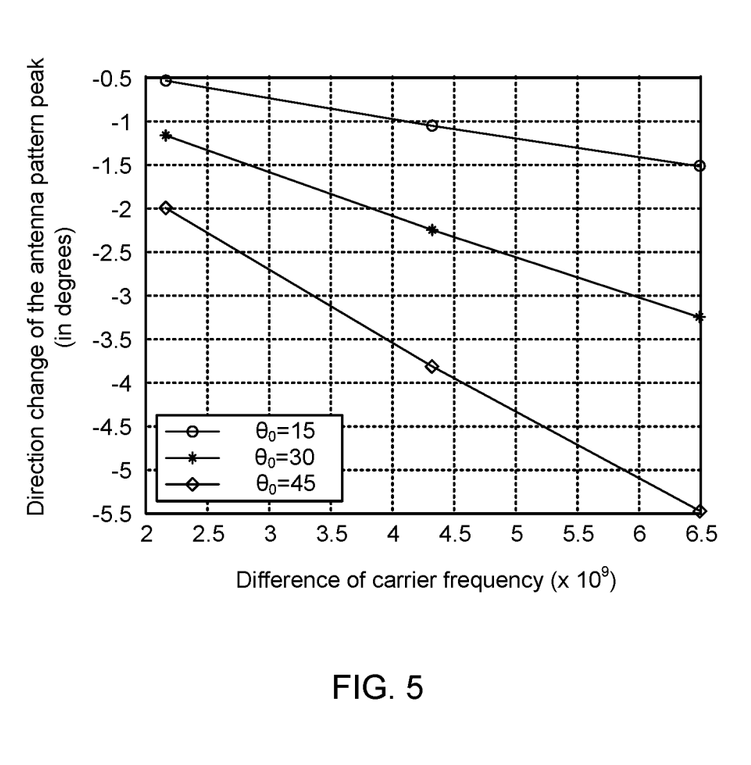
FIG. 5 is a graph illustrating the change in beam peak angle as a function of change in the carrier frequency and the desired angel (direction), for a phased antenna array.

This phenomenon limits the effective bandwidth of the antenna array 14 in achieving a desired transmission sector, and results in a squint pattern in which the angle of the beam main lobe is reduced for frequencies above a design frequency, and increased for frequencies below the design frequency. This effect may be seen in FIG. 2A, as respective beam main lobe 46 appearing at different angles within each sector 16 of the antenna array 14. This effect is further illustrated in FIG. 5 which shows an example of how the beam peak angle changes ($\Delta\theta=\theta-\theta_0$) according a change in carrier frequency ($\Delta f=f-f_0$) in a phased array antenna, for three different example values of $\theta_0$. As shown, the angle of the beam main lobe may shift by as much as about 5 degrees for a change in channel carrier frequency of 6.48 GHz. Such a angle shift of the beam main lobe may render accurate steering of certain sectors difficult in certain bandwidths, such as the 60 GHz unlicensed band having six allocated carrier frequencies of 58.32 GHz, 60.48 GHz, 62.64 GHz, 64.80, 66.96 and 69.12 GHz, the highest and lowest of which are separated by 10.80 GHz.

Accordingly, systems and methods for transmitting beacon frames that may at least partially address one or more of the above limitations, while also having improved reliability, robustness, and versatility, are desired.

Figure 6:
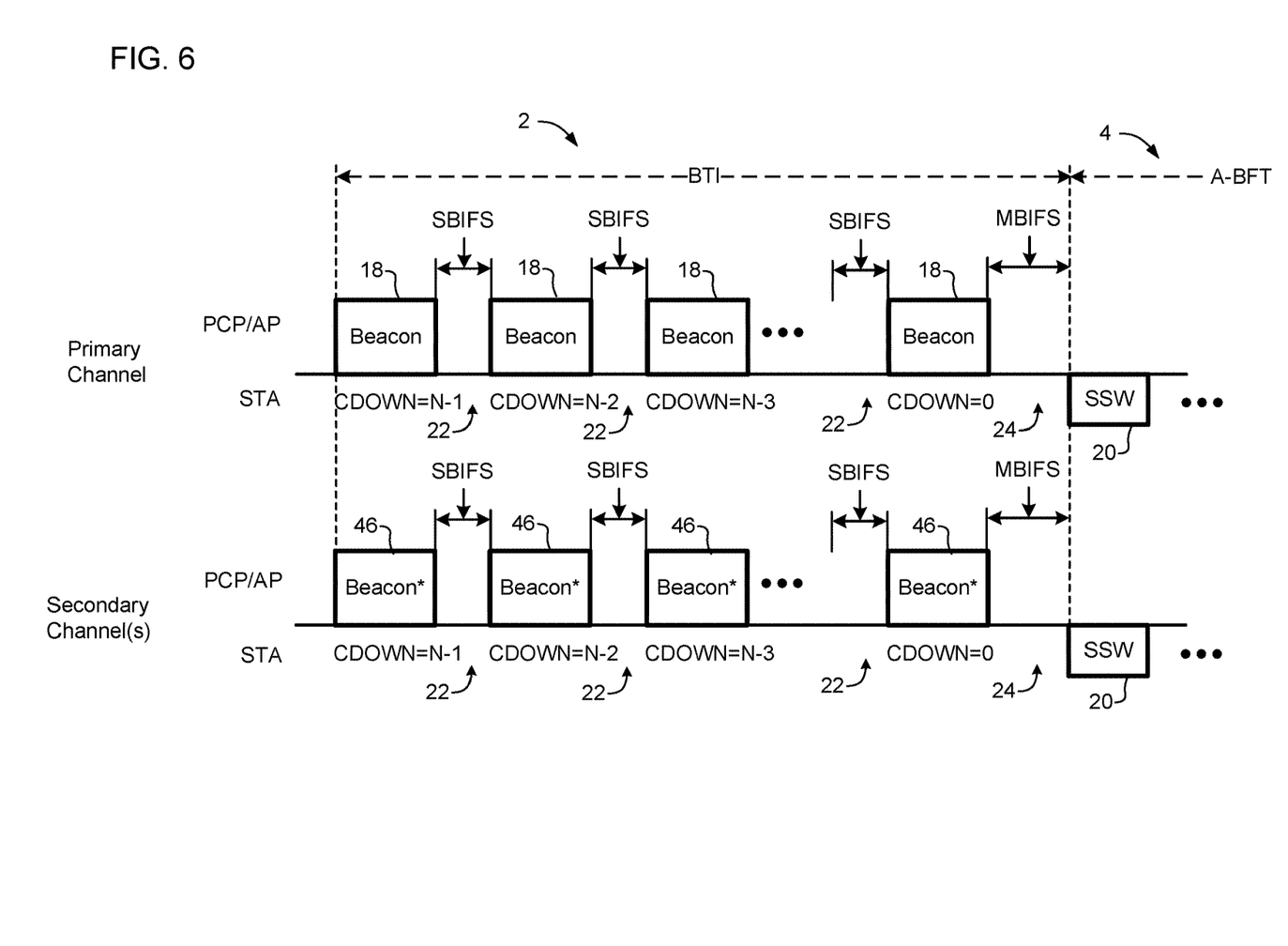
FIG. 6 illustrates the transmission of beacon frames during a BTI using multiple channels and single antenna, according to an example embodiment.

FIG. 6 illustrates the transmission of beacon frames during a BTI 2 using multiple channels, according to an example embodiment. The transmission of beacon frames shown in FIG. 6 is similar to that shown in FIG. 2B, but differs in that beacon frames are simultaneously transmitted from an antenna 14 over a primary channel and one or more secondary channel(s), and that the beacon frames transmitted over the secondary channel(s) may be evolved beacon frames (shown as "Beacon*") which can be received and decoded by evolved DMG (EDMG) STAs only. This will be explained in further detail below. For ease of illustration, FIGS. 6-9 illustrate example embodiments in which a single secondary channel is used. However, it will be appreciated that more than one secondary channel may be used, if desired.

Preferably, the respective carrier frequency of the (or each) secondary channel is offset from that of the primary channel by a desired amount. For example, consider the above mentioned 60 GHz unlicensed band having six allocated carrier frequencies of 58.32 GHz, 60.48 GHz, 62.64 GHz, 64.80 GHz, 66.96 GHz and 69.12 GHz. In this example, the carrier frequency of the primary channel could be selected to coincide with one of the allocated carrier frequencies (e.g. 58.32 GHz, and five secondary channels (having carrier frequencies of 60.48 GHz, 62.64 GHz, 64.80 GHz, 66.96 GHz and 69.12 GHz, for example) may be transmitted simultaneously with the primary channel. Naturally, the primary channel may be transmitted with a different carrier frequency, and more or fewer secondary channels may be transmitted on different selected carrier frequencies, as desired.

For example, the PCP/AP (not shown) may be an Evolved Directional Multi Gigabit (EDMG) device capable of transmitting beacon frames over multiple channels in accordance with the present disclosure. With reference to FIG. 6, the PCP/AP transmits N successive beacon frames 18 over the primary channel during the BTI 2, each spaced by an SBIFS 22, and followed by an MBIFS 24 substantially as described above with reference to FIG. 2B. The PCP/AP also simultaneously transmits N successive evolved beacon frames (Beacon*) 46 over the (or each) secondary channel in the same BTI 2, successive Beacon* frames 46 also being spaced apart by an SBIFS 22, and followed by an MBIFS 24 after the last evolved beacon frame 46.

As may be appreciated, the transmission of conventional (DMG) beacon frames 18 on the primary channel means that a conventional STA that is incapable of receiving evolved beacon frames 46 can still communicate with the PCP/AP using the primary channel. Similarly, evolved STAs that are capable of receiving evolved beacon frames 46 can communicate with the PCP/AP using either the primary channel or a secondary channel. Simultaneous transmission of beacon frames 18, 46 over multiple channels, each of which has a different carrier frequency, may allow beamforming training to be performed for each channel, which can reduce the effect of beam squinting in wideband channels when compared to transmitting beacon frames over a single channel of a fixed carrier frequency.

The availability of multiple channels and the PCP/AP capability of reception over multiple channels can be indicated in the beacon frames (for example in a channel ID field), and may also be recognized by an STA through detection of different types of beacon frames. The availability of multiple channels and the PCP/AP capability of reception over multiple channels allows for subsequent BSS operations (such as beamforming) to be performed on a preferred channel. For example, an STA may choose the sector and channel which has the greatest signal to noise (SNR) ratio, or may select the sector and channel based on other measurement criteria. This can serve to minimize performance degradation when transmitting sector sweep feedback (SSW-Feedback) frames during A-BFT 4, for example.

Moreover, the transmission of beacon frames over multiple channels enhances system versatility, because some STAs may be capable of receiving beacon frames on different channels (either simultaneously or independently), thus ensuring more reliable and robust reception.

In certain embodiments, an EDMG PCP/AP can determine the number of channels available for operation (for example, according to a wireless standard or protocol), and may assign the channels accordingly for transmission of beacon frames. For example, when the EDMG PCP/AP determines that only one channel is available, it may assign that channel as the primary channel. If the EDMG PCP/AP determines that multiple suitable channels are available, it may assign one channel as the primary channel and any other channels as secondary channels.

In certain embodiments, the EDMG PCP/AP defines a primary channel with one carrier frequency as the primary channel having a chosen bandwidth (of 2.16 GHz for example), on which both DMG and EDMG STAs may operate, and defines a secondary channel with a second carrier frequency and having a chosen bandwidth (of 2.16 GHz, for example), on which only EDMG STAs may operate.

In certain embodiments, the EDMG PCP/AP may transmit over the primary channel one or more beacon frames 18 that are decodable by both DMG STAs and EDMG STAs. The EDMG PCP/AP may also transmit over the secondary channel one or more evolved beacon frames 46 that are decodable by only EDMG STAs, all within the same BTI 2. This procedure allows DMG STAs to still receive and decode conventional beacon frames 18 over the primary channel according to various legacy wireless standards (such as IEEE 802.11ad, for example), while also preventing them from erroneously decoding the evolved beacon frames 46 transmitted on the secondary channel(s).

In certain embodiments, the beacon frames 18, 46 further include a field which indicates the available channels for beacon transmission and/or BSS operations and the PCP/AP capability of reception over multiple channels. For example, the field may indicate the availability of a primary channel only, primary and secondary channels, or multiple channels and the PCP/AP capability of reception over multiple channels, according to certain embodiments. These channels may then be reserved for further BSS operations, such as A-BFT. Accordingly, when an STA receives a beacon frame 18, 46, it is informed of the available channels on which it may perform A-BFT operations, including the transmission of SSW frames, and the capability of the AP to detect/decode signals over multiple channels.

In certain embodiments, the beacon frames may be evolved beacon frames 46 (Beacon*) intended for EDMG STAs, and encoded in such a way that they can only be decoded by an EDMG STA. For example, evolved beacon frames 46 transmitted on the secondary channel may contain the same media access control (MAC) protocol data unit (MPDU) as conventional beacon frames 18, but contain a different physical layer convergence procedure (PLCP) protocol data unit (PPDU).

In certain embodiments, for example, evolved beacon frames 46 may be transmitted using a modified modulation and coding scheme (MCS, such as modified MCS0) as defined under certain IEEE 802.11ad protocols which can only be correctly decoded by EDMG STAs. This is in contrast to beacon frames 18 transmitted using MCS0 under IEEE 802.11ad which can be decoded by both DMG STAs and EDMG STAs.

In certain embodiments, the evolved beacon frame 46 may have a packet structure with certain portions decodable by DMG STAs (and EDMG STAs), and certain portions that are only decodable by EDMG STAs. For example, the evolved beacon frame 46 may have a PPDU packet structure including a short training field (STF) 36, channel estimation field (CEF) 38, and PPDU header 30 as described above with reference to FIG. 3A. However, the data field 32 or a part of the data field 32 may be encoded using a modified MCS0 using, for example, quadrature binary phase shift keying (QBPSK) modulation (as contrasted with conventional BPSK encoding known from IEEE802.11ad, for example) such that conventional STAs (operating under IEEE 802.11ad protocol, for example) are unable to decode this portion of the frame. If desired, a portion of the data field 32 (such as the leading 6 bytes) may be encoded with the conventional MSC (e.g. BPSK) to retail compatibility with legacy systems, while a remaining portion of the data field 32 is encoded with the modified MSC0.

In certain embodiments, beacon frames that are duplicated over multiple channels can be detected and decoded by STAs using frequency diversity. Thus, for example, an EDMG STA may detect and decode duplicate beacon frame 18 and evolved beacon frames 46 transmitted over the primary channel and two or more secondary channels. If desired, the duplicated beacon frames may then be combined using known methods to improve beacon error rate performance.

In certain embodiments, the beacon frames (Beacon, Beacon*) 18, 46 may include a sector sweep (SSW) 20 field such that initiator sector sweep BF operations may be performed over one or more different channels.

In certain embodiments, the transmission of beacon frames 18, 46 using multiple channels allows for subsequent BSS operations to be performed over the multiple channels. For example, the transmission of beacon frames 18, 46 using multiple channels effectively announces the availability of, and reserves, the multiple channels for subsequent performance of beamforming operations. An STA may recognize the different channels through the beacon frames (for example, through fields which may indicate the primary channel ID, available channels, etc. in a beacon frame, or through discerning the different types of beacon frames), and perform responder sector sweep (RSS) beamforming with the PCP/AP during the subsequent A-BFT or operations in ATI and DTI intervals using one or more of the different channels. The STA may also respond directly the PCP/AP which sent the beacon frame, and report the selected Antenna ID, Sector ID, and Channel ID over which it wishes to perform subsequent operations. The transmission of beacon frames using multiple channels announces the PCP/AP capability of reception over multiple channels for subsequent performance of beamforming operations. The STA may also perform A-BFT operation using multiple channels to reduce the incidence of sector sweep frame collisions when compared to operating over a single channel.

Figure 7:
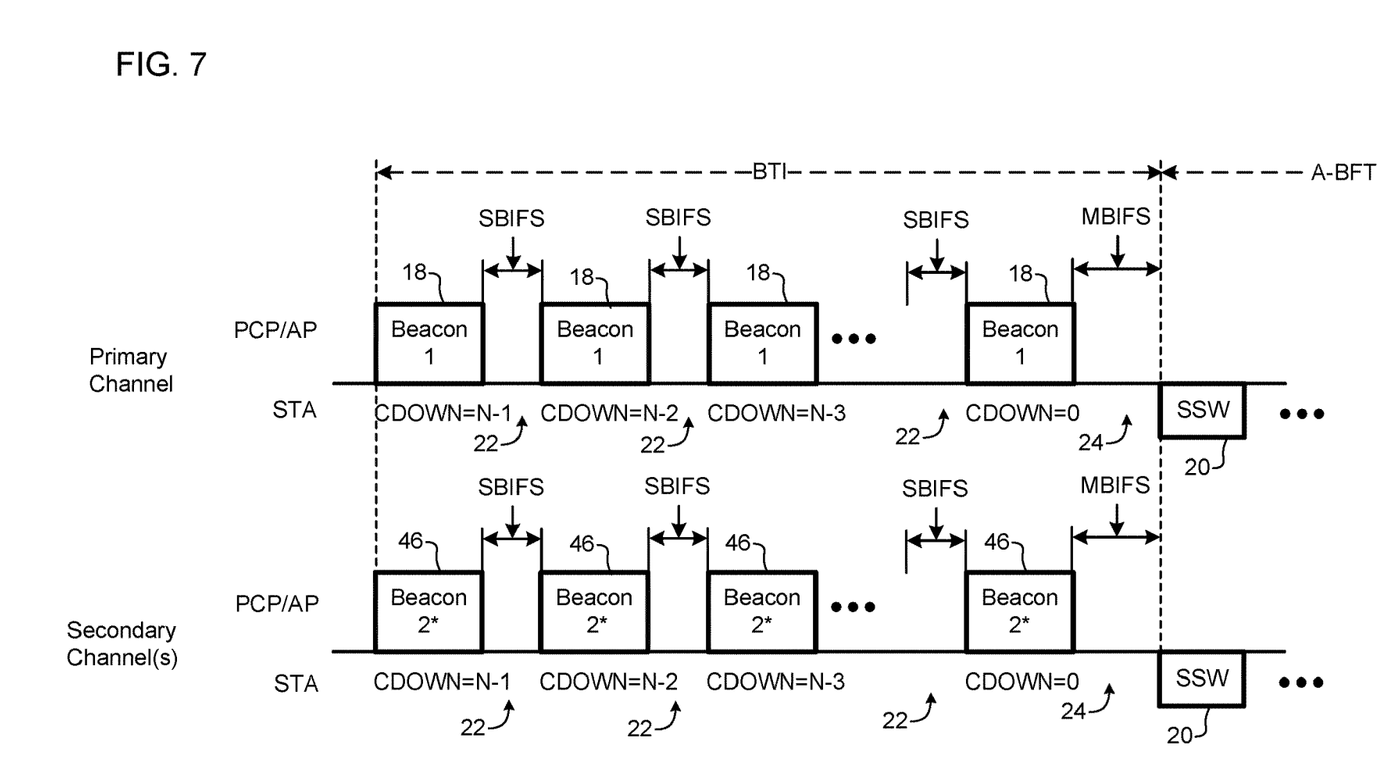
FIG. 7 illustrates the transmission of beacon frames during BTI using multiple channels and single antenna, according to another example embodiment.

FIG. 7 illustrates the transmission of beacon frames during BTI 2 using multiple channels, according to another example embodiment. The transmission of beacon frames 18, 46 shown in FIG. 7 is similar to that shown in FIG. 6, but differs in that beacon frames sent over the primary and secondary channels (Beacon1 and Beacon2*) have respective different data field 32 contents targeted towards different types of STAs (DMG and EDMG, for example), but the same packet length to ensure synchronization across both channels.

Referring to FIG. 7, the PCP/AP transmits beacon frames (Beacon1) 18 over the primary channel that are decodable by both DMG STAs and EDMG STAs, and contain DMG beacon related information, while also transmitting evolved beacon frames (Beacon2*) 46 over the secondary channel that are decodable by EDMG STAs only, and which contain EDMG beacon related information. In this way, the PCP/AP can distribute specialized information intended for specific types of STAs. As described above, the beacon frames (Beacon1) 18 and evolved beacon frames (Beacon2*) 46 have the same packet length to ensure synchronization across both channels.

In certain embodiments, the beacon frames 18 transmitted on the primary channel (Beacon1) are modulated using MCS0 known from IEEE 802.11ad, and the evolved beacon frames 46 transmitted on the secondary channel (Beacon2*) are modulated using a modified MCS0 scheme known from IEEE 802.11ay, for example. In this way, a STA under IEEE 802.11ad cannot decode the evolved beacon frames (Beacon2*) 46. However, STAs under IEEE 802.11ay, for example, may decode both types of beacon frames (Beacon1 and Beacon2*).

In certain embodiments, a duration field of both beacon frame structures (Beacon1 and Beacon2*) 18, 46 may indicate a time remaining in the BTI 2, in accordance with IEEE 802.11ad protocol.

In certain embodiments, the evolved beacon frame (Beacon2*) PPDU packet structure may include STF 36, CEF 38, and PPDU header 30 fields that are the same as IEEE 802.11ad protocol. In this way, a DMG STA under IEEE 802.11ad can still detect the length and MCS fields of the evolved beacon frame 46 (Beacon2*) PHY header packet structure. However, the data field 32 or a part of data field 32 of the evolved beacon frame 46 (Beacon 2*) packet structure may be encoded with a modified MCS0 using QBPSK modulation such that a DMG STA under IEEE 802.11ad cannot decode this portion of the frame. This feature allows legacy STA devices to still receive and decode certain portions of the evolved beacon frame 46 (Beacon2*) to recognize the existence of different channels, while preventing such legacy STAs from erroneously decoding the data portion 32 intended for other EDMG STAs that may operate under different protocol standards In certain embodiments, DMG or EDMG STAs may obtain beacon information according to the different beacon frames sent over available channels. For example, when only one channel is available, the PCP/AP may transmit beacon frames containing DMG beacon information. When there are two available channels, the PCP/AP may transmit beacon frames 18 containing DMG beacon information over a primary channel, and evolved beacon frames 46 containing EDMG beacon information over a secondary channel. STAs may receive one or both types of beacon frames, and decode portions of the beacon frames according to their ability and capacity.

In certain embodiments, the beacon frames (Beacon1, Beacon2*) may contain a sector sweep (SSW) field 20 such that initiator sector sweep BF operations may be performed over one or more different channels.

In certain embodiments, the transmission of beacon frames using multiple channels allows for subsequent performance of BSS operations to be performed over the multiple channels. For example, STAs may recognize the availability of different channels upon receiving the beacon frames (for example, through fields which may indicate the primary channel ID, available channels, etc. in a beacon frame, or through discerning the different types of beacon frames) and the PCP/AP capability of reception over multiple channels, and perform responder sector sweep (RSS) beamforming with the PCP/AP during the subsequent A-BFT or operations in ATI and DTI interval using one or more of the available channels. The STA may also respond directly the PCP/AP which sent the beacon frame, and report the desired Antenna ID, Sector ID, and Channel ID over which it wishes to perform subsequent operations.

Figure 8:
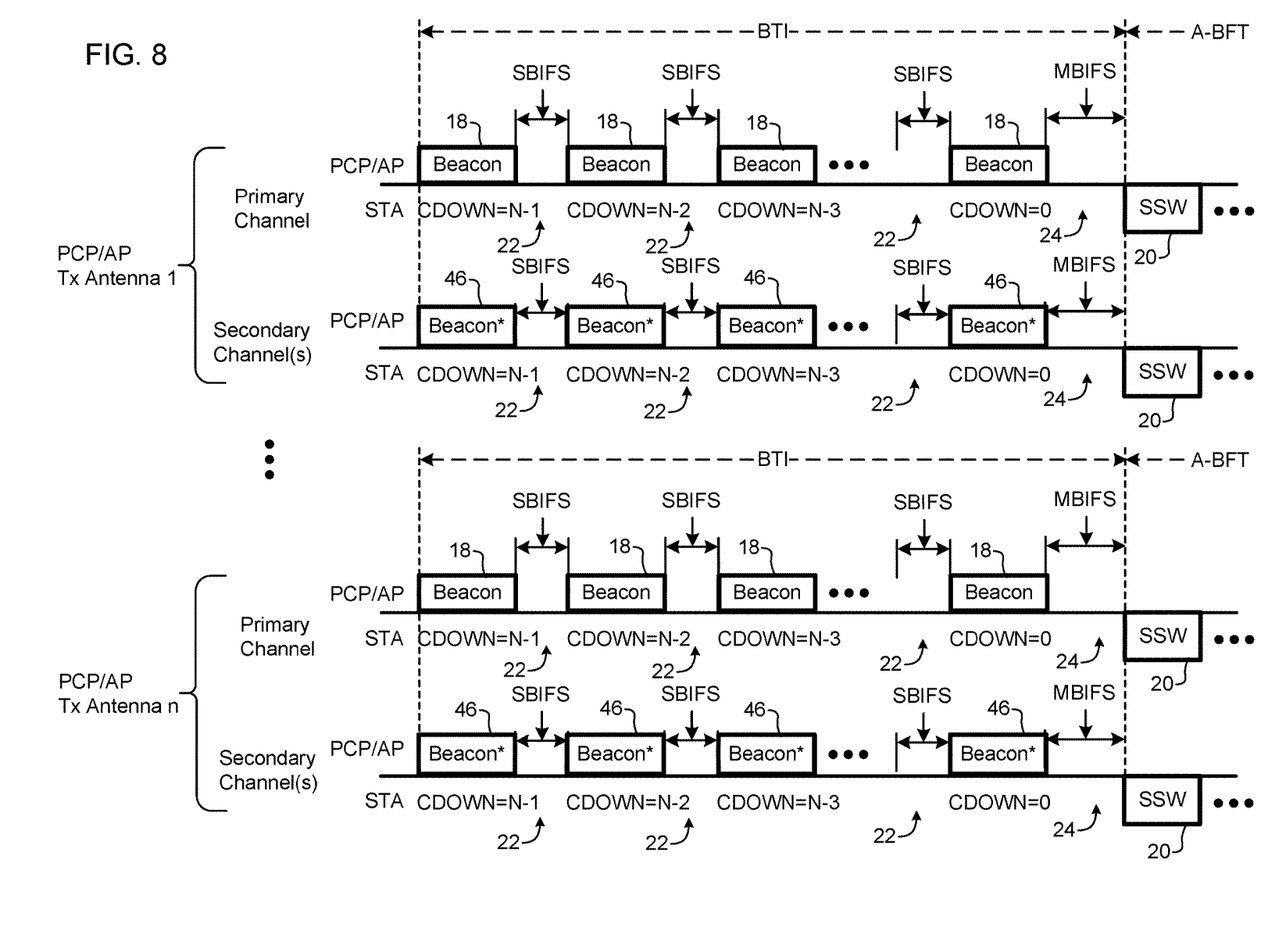
FIG. 8 illustrates beacon frame transmission over multiple channels using multiple antennas, according to an example embodiment.

FIG. 8 illustrates beacon frame transmission over multiple channels, according to another example embodiment. The beacon frame transmission shown in FIG. 8 is similar to that shown in FIG. 6, but performed simultaneously by multiple (n) antennas or antenna arrays 14. For example, each of the n antennas 14 may be oriented in a different direction so that the beacon frames (Beacon, Beacon*) are transmitted over a broader coverage area to reach additional STAs.

Figure 9:
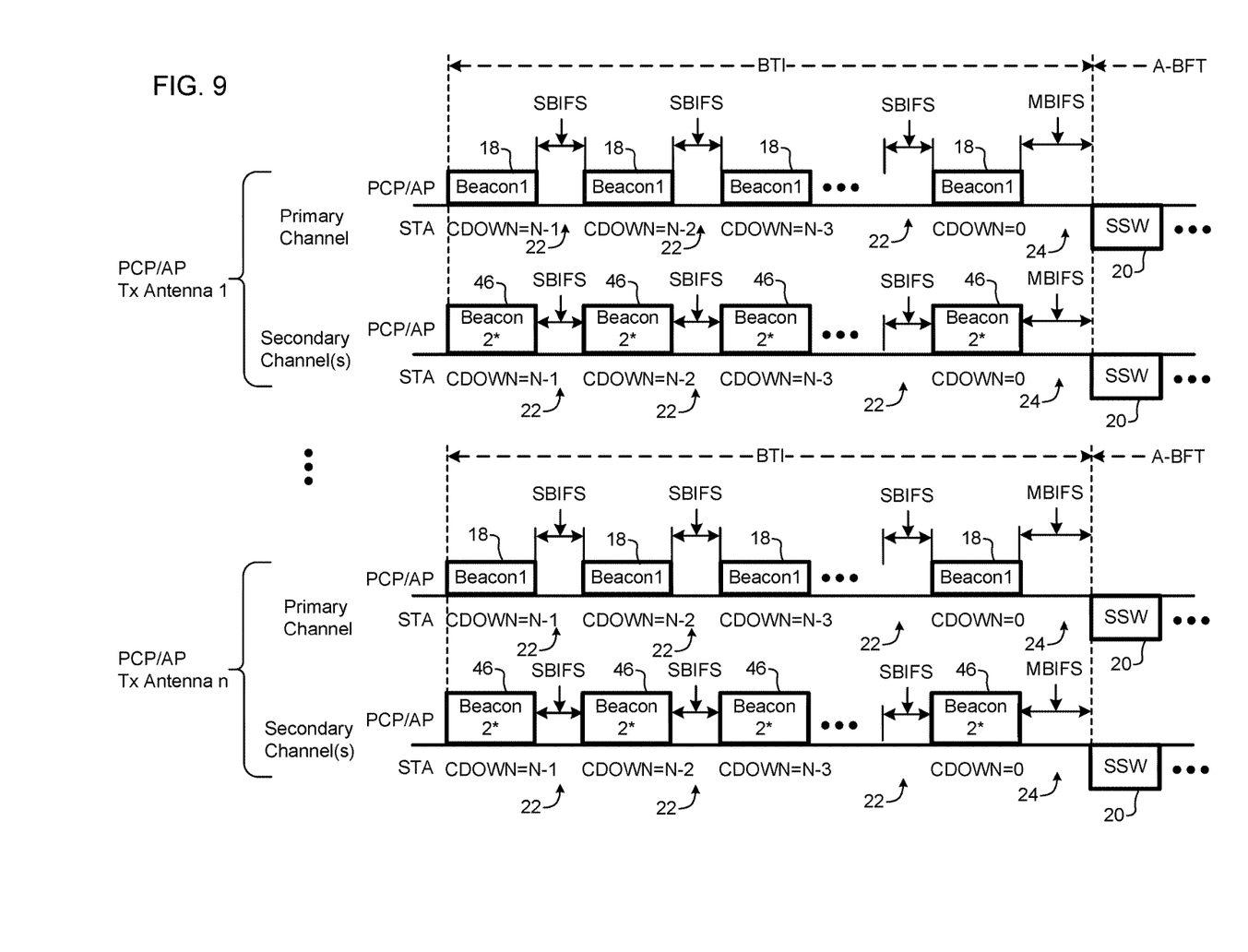
FIG. 9 illustrates beacon frame transmission over multiple channels using multiple antennas, according to another example embodiment.

FIG. 9 illustrates beacon frame transmission over multiple channels, according to another example embodiment. The beacon frame transmission shown in FIG. 9 is similar to that shown in FIG. 7, but performed simultaneously by multiple (n) antennas or antenna arrays 14. For example, each of the n antennas 14 may be oriented in a different direction so that the beacon frames (Beacon1, Beacon2*) are transmitted over a broader coverage area to reach additional STAs.

Embodiments disclosed herein disclose systems and methods for transmitting beacon frames 18, 46 over multiple channels from the same antenna or antenna array 14. This may reduce the effects of beam squinting compared to transmitting beacon frames over a single channel in certain applications. Further, this may result in more versatile, reliable, and robust delivery of beacon frames to various wireless devices. For example, different types of wireless devices may be targeted through specific beacon frames transmitted on different channels. The use of multiple channels may also improve the efficiency of subsequent beamforming training procedures.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium. The software product includes instructions that enable a computer device (personal computer, server, or network device) to execute the methods provided in the embodiments of the present invention. For example, such an execution may correspond to a simulation of the logical operations as described herein. The software product may additionally or alternatively include instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for transmitting beacon frames from an access point including at least one antenna, the method comprising:

transmitting with a selected antenna of the access point, one or more first beacon frames over a primary channel within a beacon transmission interval; and transmitting with the selected antenna of the access point, one or more second beacon frames over a secondary channel within the beacon transmission interval;

wherein the one or more first beacon frames are decodable by a first receiving station type and a second receiving station type, and the one or more second beacon frames are decodable by the first receiving station type but undecodable by the second receiving station type.

2. The method of claim 1, wherein the one or more first beacon frames are simultaneously transmitted with the one or more second beacon frames.

3. The method of claim 1 wherein the one or more second beacon frames comprise evolved beacon frames different from the one or more first beacon frames.

4. The method of claim 3 wherein one or more fields of the evolved beacon frames are encoded using a modified modulation coding scheme different from that used to encode corresponding fields of the first beacon frames.

5. The method of claim 4 wherein at least a portion of the data field of the evolved beacon frame is modulated using the modified modulation coding scheme.

6. The method of claim 1 wherein the first and second beacon frames comprise a channel ID field identifying the channel on which it was transmitted.

7. The method of claim 1 further comprising determining, by the access point, available channels for transmitting beacon frames, wherein the step of transmitting one or more second beacon frames over the secondary channel is performed when there are at least two available channels.

8. The method of claim 1 wherein data fields of the first beacon frames are different from corresponding data fields of the second beacon frames.

9. The method of claim 1 wherein a packet length of the one or more first beacon frames is the same as the packet length of the one or more beacon frames transmitted over the second channel.

10. The method of claim 1 wherein there are two or more available channels, and wherein the method further comprises designating, by the access point, one of the available channels as the primary channel and other ones of the available channels as secondary channels, and wherein the step of transmitting one or more second beacon frames over the secondary channel is performed on each designated secondary channel.

11. The method of claim 1 wherein the antenna is configured to transmit in two or more sectors, and wherein the steps of transmitting one or more first beacon frames over a primary channel within a beacon transmission interval and transmitting one or more second beacon frames over a secondary channel within the beacon transmission interval are repeated for each sector.

12. The method of claim 11 wherein the first and second beacon frames comprise a sector ID field identifying a sector in which it was transmitted.

13. The method of claim 1 wherein the access point comprises at least two antennas, and wherein the steps of transmitting one or more first beacon frames over a primary channel within a beacon transmission interval and transmitting one or more second beacon frames over a secondary channel within the beacon transmission interval are repeated for each antenna.

14. The method of claim 13 wherein the first and second beacon frames comprise an antenna ID field identifying an antenna from which it was transmitted.

15. An access point of a communications network, the access point comprising:
   at least one antenna;
   at least one central processing unit; and
   a non-transitory storage medium comprising software instructions for controlling the at least one central processing unit to perform steps of:
     transmitting with a selected antenna of the access point, one or more first beacon frames over a primary channel within a beacon transmission interval; and
     transmitting with the selected antenna of the access point, one or more second beacon frames over a secondary channel within the beacon transmission interval;
     wherein the one or more first beacon frames are decodable by a first receiving station type and a second receiving station type, and the one or more second beacon frames are decodable by the first receiving station type but undecodable by the second receiving station type.

16. The access point of claim 15 wherein the non-transitory storage medium further comprises software instructions for controlling the at least one central processing unit to perform a step of determining available channels for transmitting beacon frames, wherein the step of transmitting one or more second beacon frames over the secondary channel is performed when there are at least two available channels.

17. The access point of claim 16 wherein there are two or more available channels, and wherein the non-transitory storage medium further comprises software instructions for controlling the at least one central processing unit to perform a step of designating one of the available channels as the primary channel and other ones of the available channels as secondary channels, and wherein the step of transmitting one or more second beacon frames over the secondary channel is performed on each designated secondary channel.

18. The access point of claim 15 wherein the antenna is configured to transmit in two or more sectors, and wherein the steps of transmitting one or more first beacon frames over a primary channel within a beacon transmission interval and transmitting one or more second beacon frames over a secondary channel within the beacon transmission interval are repeated for each sector.

19. The access point of claim 15, wherein the access point comprises at least two antennas, and wherein the steps of transmitting one or more first beacon frames over a primary channel within a beacon transmission interval and transmitting one or more second beacon frames over a secondary channel within the beacon transmission interval are repeated for each antenna.

20. A non-transitory storage medium comprising software instructions for controlling at least one central processing unit of an access point including at least on antenna to perform steps of:
   transmitting with a selected antenna of the access point, one or more first beacon frames over a primary channel within a beacon transmission interval; and
   transmitting with the selected antenna of the access point, one or more second beacon frames over a secondary channel within the beacon transmission interval;
   wherein the one or more first beacon frames are decodable by a first receiving station type and a second receiving station type, and the one or more second beacon frames are decodable by the first receiving station type but undecodable by the second receiving station type.

\* \* \* \* \*

UNITED STATES PATENT AND TRADEMARK OFFICE
CERTIFICATE OF CORRECTION

PATENT NO. : 10,305,666 B2
APPLICATION NO. : 15/295491
DATED : May 28, 2019
INVENTOR(S) : Yan Xin, Sheng Sun and Osama Aboul-Magd Page 1 of 1

It is certified that error appears in the above-identified patent and that said Letters Patent is hereby corrected as shown below:

In the Specification

Column 4, Line 62 "$(\Delta\theta – \theta – \theta_O)$" should read -- $(\Delta\theta = \theta - \theta_0)$ --

Signed and Sealed this
Nineteenth Day of November, 2019

Andrei Iancu
*Director of the United States Patent and Trademark Office*